(12) United States Patent
De Smedt

(10) Patent No.: US 8,310,932 B2
(45) Date of Patent: Nov. 13, 2012

(54) SYSTEM AND METHOD FOR SHARING AN ACCESS LINE BANDWIDTH

(75) Inventor: Alex De Smedt, Olen (BE)

(73) Assignee: Thomson Licensing (FR)

( * ) Notice: Subject to any disclaimer, the term of this patent is extended or adjusted under 35 U.S.C. 154(b) by 228 days.

(21) Appl. No.: 12/735,300

(22) PCT Filed: Jan. 2, 2009

(86) PCT No.: PCT/EP2009/050018
§ 371 (c)(1),
(2), (4) Date: Jun. 29, 2010

(87) PCT Pub. No.: WO2009/083611
PCT Pub. Date: Jul. 9, 2009

(65) Prior Publication Data
US 2010/0284277 A1    Nov. 11, 2010

(30) Foreign Application Priority Data

Jan. 2, 2008 (EP) .................... 08447001
Apr. 1, 2008 (EP) .................... 08447021

(51) Int. Cl.
*G01R 31/08* (2006.01)
(52) U.S. Cl. ...................... 370/235; 370/401
(58) Field of Classification Search .......... None
See application file for complete search history.

(56) References Cited

U.S. PATENT DOCUMENTS

| 6,075,784 | A | * | 6/2000 | Frankel et al. | 370/356 |
| 7,860,097 | B1 | * | 12/2010 | Lovett et al. | 370/392 |
| 2002/0129143 | A1 | | 9/2002 | McKinnon et al. | |
| 2007/0237177 | A1 | | 10/2007 | Endo et al. | |
| 2009/0125617 | A1 | * | 5/2009 | Klessig et al. | 709/223 |

FOREIGN PATENT DOCUMENTS

EP    1158830    11/2001

OTHER PUBLICATIONS

Search Rept Feb. 27, 2009.

* cited by examiner

*Primary Examiner* — David Oveissi
(74) *Attorney, Agent, or Firm* — Jack Schwartz and Associates, PLLC

(57) ABSTRACT

The present invention concerns a method for controlling upstream bandwidth at a device the device comprising an interface to a first network, at least a local interface to at least a second network, the at least second network comprising more than one gateway device. The method comprises the steps of monitoring the available bandwidth value on the first network and periodically indicating to said more than one gateway device the maximum upstream bandwidth available to said more than one gateway device, the maximum upstream bandwidth depending on the available bandwidth, the number of the more than one gateway device connected to the device, and the number of local interfaces connected to the more than one gateway device.

7 Claims, 2 Drawing Sheets

SYSTEM AND METHOD FOR SHARING AN ACCESS LINE BANDWIDTH

This application claims the benefit, under 35 U.S.C. §365 of International Application PCT/EP2009/050018, filed Jan. 2, 2009, which was published in accordance with PCT Article 21(2) on Jul. 9, 2009 in English and which claims the benefit of European patent application No. 0844700.2, filed on Jan. 2, 2008 and European patent application No. 08447021.0, filed Apr. 1, 2008.

FIELD OF THE INVENTION

The present invention relates generally to broadband access and in particular to a method to share the bandwidth dynamically among a plurality of gateways.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

The broadband access was originally seen as a modem offering Internet access to a single Ethernet and IP-based device, such as a computer device, through a single broadband access provider. Later a bridge or router was integrated together with the modem unit in order to serve multiple devices. The combined unit was called a home gateway (HG). It was able to attach different home equipments to the IP based networks over one access line, through a single broadband access provider.

Another scheme for Internet access is a system where a device comprises a modem and a VLAN multiplexer. This device forms a VLAN based network termination (NT), serving as a VLAN-based multi dwelling unit. Multiple home gateways can be connected to this VLAN based Network Termination, where the home gateway device does not comprise any modem functionality. Each of these home gateways may be connected to a different broadband access provider, using a set of VLANs. The Network Termination supports multi-provider environment. The access line bandwidth (Bw) is shared between multiple gateways. Each gateway is supposed to be allocated a maximum available upstream bandwidth.

When the sum of all the HG bandwidth capabilities is higher than the available access line bandwidth, there is a possible overflow of bandwidth streams in the upstream direction.

SUMMARY OF THE INVENTION

The present invention attempts to remedy at least some of the concerns connected with bandwidth overflow, by providing a mechanism to dynamically manage the bandwidth allocation between the gateways, allowing them to supersede a mean or weighted bandwidth as long as there is enough upstream access bandwidth, but force a graceful reduction when the upstream access bandwidth gets filled up.

The present invention concerns a method for controlling upstream bandwidth at a device, the device comprising an interface to a first network, at least a local interface to at least a second network, the at least second network comprising more than one gateway device.

To this end, the method comprises the steps of monitoring the available bandwidth value on the first network and periodically indicating to said more than one gateway device the maximum upstream bandwidth available to said more than one gateway device, the maximum upstream bandwidth depending on the available bandwidth, the number of the more than one gateway device connected to the device, and the number of local interfaces connected to the more than one gateway device.

According to an embodiment, the available bandwidth value is first shared per the local interfaces and then shared per gateway device.

Another object of the invention is a device for connecting more than one gateway device to a first network.

To this end, the device comprises a first interface to a first network, at least a second interface to at least a second network for connecting to the more than one gateway device, a Virtual LAN multi dwelling unit and a bandwidth control management module for monitoring the available bandwidth on the first interface, and for dynamically sharing the available bandwidth into maximum upstream bandwidth per the more than one gateway device.

According to an embodiment, the first interface is an interface to a broadband access subscriber line.

According to an embodiment, the device comprises means for dynamically indicating the maximum upstream bandwidth to the more than one gateway device.

According to an embodiment, the device comprises a subset of an ELMI server to communicate with the more than one gateway device, the ELMI server comprising an ELMI check function for gateway device discovery, and a Single EVC Asynchronous Status procedure, where the Committed Information Rate is replaced by the maximum bandwidth a particular attached and active gateway device can use.

Another object of the invention is a computer program product comprising program code instructions for executing the steps of the process according to the invention, when that program is executed on a computer. By "computer program product", it is meant a computer program support, which may consist not only in a storing space containing the program, such as a diskette or a cassette, but also in a signal, such as an electrical or optical signal.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which:

In FIG. 1, the represented blocks are purely functional entities, which do not necessarily correspond to physically separate entities. Namely, they could be developed in the form of hardware or software, or be implemented in one or several integrated circuits.

DETAILED DESCRIPTION OF PREFERRED EMBODIMENTS

Figure 1:
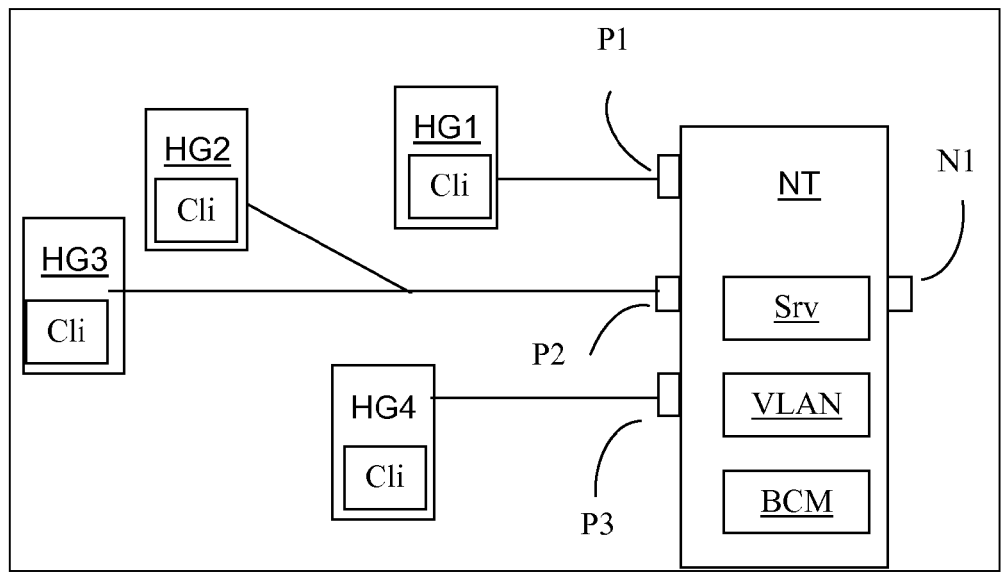
FIG. 1 illustrates a system compliant with the embodiment.

FIG. 1 represents the system according to the embodiment. It comprises a VLAN based Network Termination (NT) and multiple residential gateways (HG1, HG2, HG3, HG4).

The NT is a multi dwelling unit comprising a VLAN multiplexer. It comprises an interface (N1) to the DSL network, also well known as a WAN interface. Of course the WAN interface could be an interface to any broadband network. The NT comprises interfaces (P1, P2, P3) to different local area networks (LANs). The HGs are connected to the NT either in a point to point manner or through a local network such as, but not limited to, an Ethernet network. At the NT, a port may be connected to a single HG or to a plurality of HGs. As indicated in FIG. 1, the NT comprises 3 ports (P1, P2, P3). Only one HG is connected to the first port P1 and the third port P3. Two HGs are connected to the second port P2.

The NT comprises a bandwidth control management module (BCM). The BCM is adapted to periodically and dynamically measuring the actual available bandwidth on the WAN. The actual bandwidth represents the bandwidth available at the time when the measurement is performed. It is also adapted to dynamically sharing the bandwidth between the HGs, as indicated hereinafter. It also comprises means for dynamically indicating to each HG the available maximum upstream bandwidth which it may actually send.

Coordination for bandwidth control is performed between the NT and the HGs attached to it. The ELMI protocol is used here for communication between the NT and the HGs, on the T1 reference point. ELMI is used here to dynamically notify the HGs on the available bandwidth, and also for the HG discovery by the NT. This is a different use of the ELMI protocol as defined in the Metro Ethernet Forum technical Specification, MEF 16, dated January 2006, 'Ethernet Local Management Interface (E-LMI)'. The communication protocol between the NT and the HGs uses a subset of the functionalities of the ELMI. It uses in particular the following features of ELMI:

the ELMI check function for HG discovery, the Single EVC Asynchronous Status procedure, where the Committed Information Rate (CIR) is replaced by the Bmax which can be sent by the HG using a particular VLAN which is assigned to this HG.

More generally, any protocol that has following functions may perform coordination for bandwidth control between the NT and the HGs:

An HG request to NT of the VLANs available to it (used by NT for HG discovery)

NT indicating to an HG the actual available bandwidth at regular times.

The ELMI server (Srv), the network side entity, is located in the NT. Each HG comprises an ELMI client (Cli), the user side entity. At startup-time of a HG, the HG performs an ELMI check procedure. The ELMI client sends out a STATUS ENQUIRY on the local network. Both the NT and the other HGs on the network receive the STATUS ENQUIRY message. Only the ELMI server in the NT responds with a STATUS to the sending HG. The HG and the NT get to know each others MAC address. The NT can as such keep a list of the attached HGs.

The ELMI check is done periodically, typically every 10 seconds. This polling mechanism permits the NT to detect whether a HG is still powered-on. If no STATUS ENQUIRY is sent by a particular HG for more than e.g. 30 seconds, the NT can consider that HG powered-off or detached. It updates the number of HG attached to a port. This procedure requires the HGs to have implemented the ELMI protocol, or at least a reduced version comprising the feature of ELMI indicated hereinabove.

Alternatively, the HG might not implement the ELMI protocol. The NT discovers the HG when receiving traffic, e.g. IP frames, on a port. The HG device, when sending out Ethernet frames, has to pass the information over the NT. The HG is discovered in any case.

The bandwidth control of the upstream traffic is done in the HGs. It uses the leaky bucket mechanism on the Ethernet frames, for bandwidth limitation with shaping. Alternatively it uses the token bucket mechanism on the Ethernet frames, for bandwidth limitation with bursts allowed.

The maximum upstream bandwidth between a NT and a HG is hereinafter noted BL. The bandwidth on the LAN between the NT and the HG depends on the LAN technology.

The maximum available bandwidth at the access line is hereinafter noted Bw. It is assumed that BL is inferior to Bw.

The NT shares the access line upstream bandwidth between the HGs. In particular, the access line upstream bandwidth is shared per port. The NT comprises N ports. Among the N ports, n ports are connected to a HG. The mean maximum bandwidth per port, noted Bhg, is then: Bhg=Bw/n If more than one HG, m HGs, are connected to a same port, the mean/weighted maximum bandwidth for each HG is: Bhg=Bw/n/m.

According to the embodiment, the local area network is compliant with Ethernet 100 Mbit/s. BL is then set to 100 Mbit/s. With the example of FIG. 1, n is set to 3. The value of BL is set to 100/3 Mbit/s for HG1 and HG4. HG2 and HG3 are connected to the same port P2; the value BL is then set to 100/3/2 Mbit/s.

Figure 2:
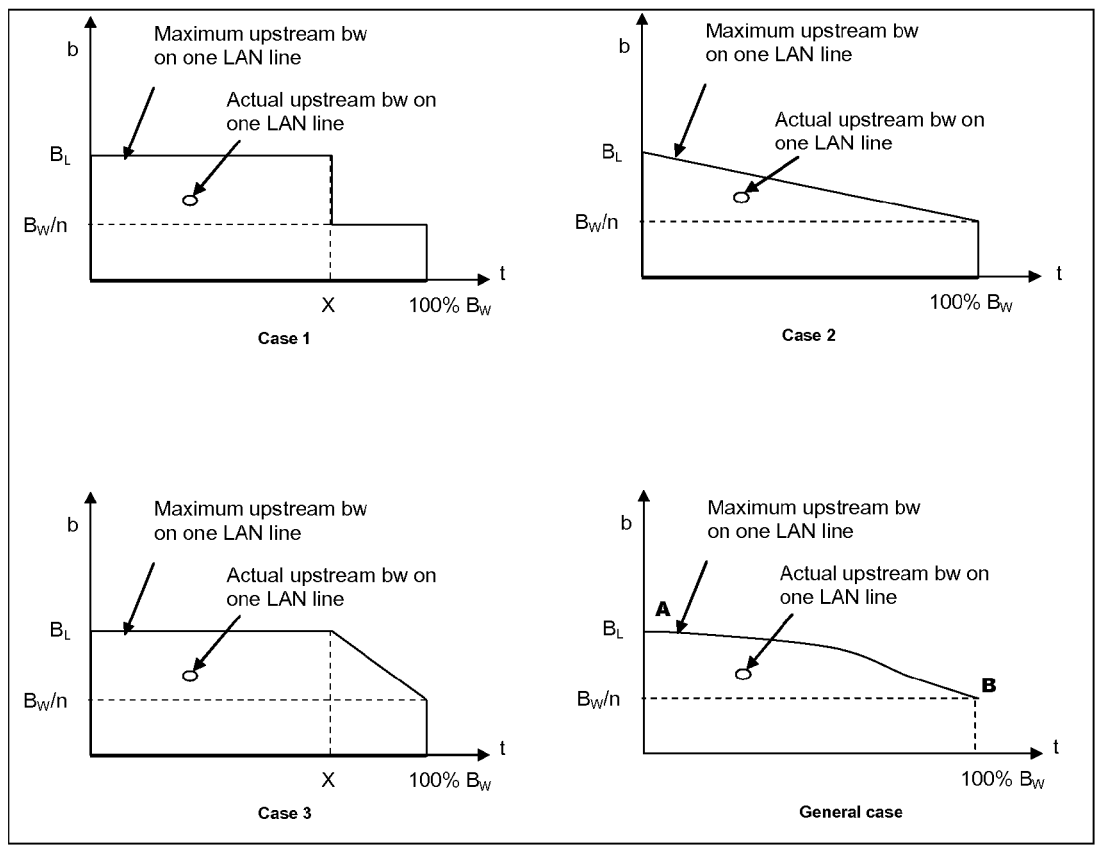
FIG. 2 illustrates four different cases for sharing bandwidth.

The FIG. 2 illustrates four different cases for sharing bandwidth. On each case, b represents the maximum actual bandwidth available, and t represents the bandwidth occupation on the access line. In each case, a HG may use more than the access line upstream bandwidth, equal to Bw/n. It may use a bandwidth up to BL. However, if the access line occupation is getting full, corresponding to Bw, the maximum bandwidth available per HG is reduced to the value indicated by the NT; in the limit this value becomes Bw/n (or Bw/n/m if m HGs on a LAN line).

The case 1 is a discontinuous bandwidth profile for the area of possible points of actual bandwidth for the upstream traffic of a HG. All cases illustrate a bandwidth profile when there is only one HG per port. If there are m HGs on a port, the values are divided by m.

A break is set to a value X equal to Bw-BL. When the occupation of the access line bandwidth is more than (Bw-BL), the actual maximum bandwidth per HG is set to Bw/n. The break could have a value X different from Bw-BL, which may depend on the traffic conditions on the LAN.

The case 2, the bandwidth available per HG has a linear profile, between the values (0, BL) and (Bw, Bw/n).

The case 3 combines the case 1 and the case 2. The bandwidth is set to BL up to a break value X set to Bw-BL. Then the profile is linear between (Bw-BL, BL) and (Bw, Bw/n).

More generally, as indicated in the general case, any function, squeezing the bandwidth between (0, BL) and (Bw, Bw/n) may be used, where the maximum bandwidth available per HG is BL.

In order to control the bandwidth, the NT performs the following:

the NT measures the bandwidth used on the access line, the NT keeps track of the bandwidth profiles of the different HGs. This depends on the number of occupied ports, and the number of HGs attached to a particular port based on the bandwidth profile, the NT calculates the maximum bandwidth (Bmax) a particular attached and active HG can use.

This calculation is based on the mentioned traffic profiles. E.g. the FIG. 3 indicates how the calculation is performed for the bandwidth profile case 2. The number of interfaces on the NT, on which there is at least one powered-on HG, is set to n. The number of powered-on HG to the line that this particular HG is attached is set to m.

Figure 3:
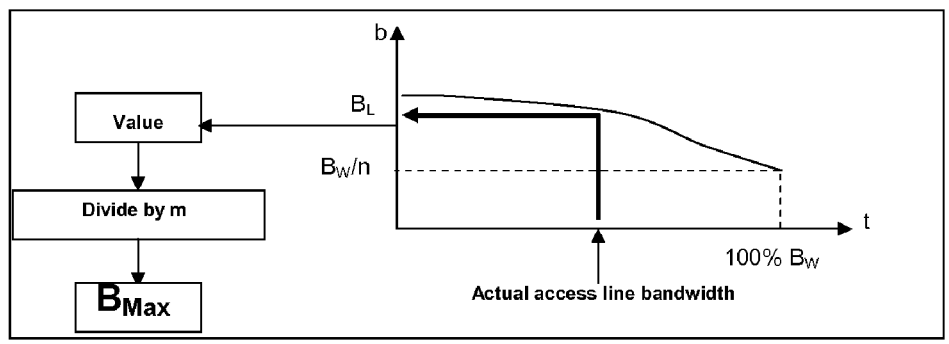
FIG. 3 illustrates the calculation of the bandwidth value.

The calculation of Bmax based on bandwidth profile is illustrated in FIG. 3. Each HG uses the Bmax value to adapt the bucket size of the leaky or bursty bucket mechanisms. The actual bandwidth sent is adapted to the request of the NT. The bucket mechanisms and how Bmax is used to adapt bucket sizes are out of the scope of the embodiment.

Figure 4:
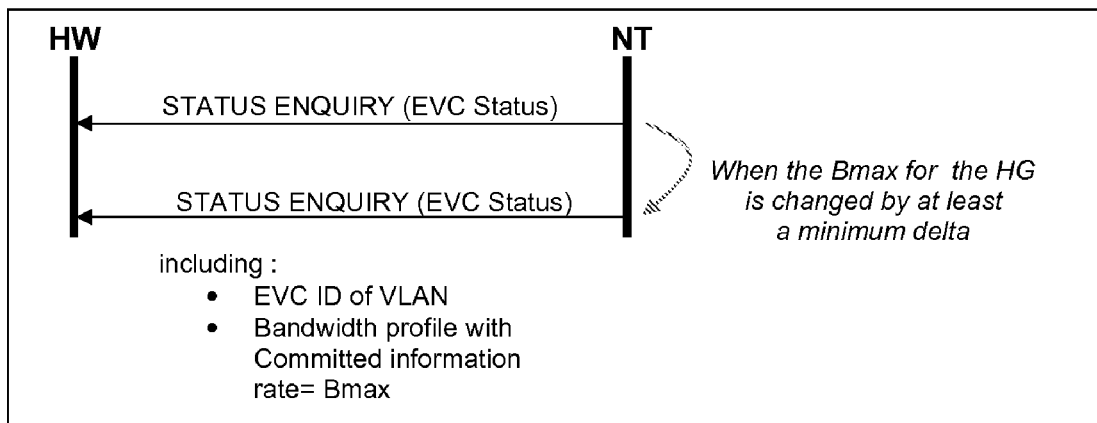
FIG. 4 illustrates information transfer using bandwidth control messages.

The NT communicates, on a periodic basis, the Bmax value to the HGs with the ELMI protocol. In particular a reduced functionality of the ELMI protocol is used, as indicated in the FIG. 4. The ELMI enables the NT to indicate an update of the available upstream bandwidth. For the linear models, this can be based on 'little' minimum steps, in order to limit the number of sent STATUS ENQUIRY notifications.

In the embodiment, the HGs are connected to the NT through the same network interface type. Of course they might be connected through different network interface type; and share the bandwidth on the access line.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:

1. Method for controlling upstream bandwidth at a device, said device comprising an interface to a first network having a maximum available bandwidth Bw, at least one local interface to at least one second network, said at least one second network comprising more than one gateway device, said at least one local interface having a maximum upstream bandwidth BL, wherein said maximum bandwidth Bw being superior to the maximum upstream bandwidth BL; wherein the method comprises the steps of:

monitoring a bandwidth occupation on the first network; and periodically indicating to said more than one gateway device the maximum upstream bandwidth available to said more than one gateway device, said maximum upstream bandwidth depending on the maximum available bandwidth on the first network and the bandwidth occupation on said first network, so that when the bandwidth occupation on said first network is equal to zero, the upstream bandwidth available is the bandwidth BL and when the bandwidth occupation on said first network is equal to the bandwidth Bw, the upstream bandwidth available is equal to the bandwidth Bw divided by the number of said more than one gateway device.

2. Method according to claim 1, wherein said available Bandwidth being first shared per said local interfaces and then shared per said more than one gateway device.

3. Method according to claim 1, wherein said upstream bandwidth available having a linear profile between the maximum upstream bandwidth BL and the available bandwidth Bw divided per the number of said more than one gateway device.

4. Method according to claim 3, wherein if the bandwidth occupation is inferior to a break value, said upstream bandwidth available is set to the maximum upstream bandwidth BL, and if the bandwidth occupation is superior or equal to the break value, said upstream bandwidth available is set to the available bandwidth Bw divided by the number of said more than one gateway device.

5. Device for connecting more than one gateway device to a first network, comprising:

a first interface to a first network having a maximum available bandwidth Bw;

at least one second interface to at least one second network for connecting to said more than one gateway device, said at least one second interface having a maximum upstream bandwidth BL, wherein said maximum bandwidth Bw being superior to the maximum upstream bandwidth BL;

and a bandwidth control management module for monitoring bandwidth occupation on said first network and for periodically indicating to said more than one gateway device the maximum upstream bandwidth available to said more than one gateway device, said maximum upstream bandwidth depending on the bandwidth Bw on the first network and the bandwidth occupation on said first network, so that when the bandwidth occupation is equal to zero, the upstream bandwidth available is the bandwidth BL and when the bandwidth occupation is equal to the bandwidth Bw, the upstream bandwidth available is equal to the available bandwidth Bw divided by the number of said more than one gateway device.

6. Device according to claim 5, wherein the first interface is an interface to a broadband access subscriber line.

7. Device according to claim 5, comprising a subset of an Ethernet Local Management Interface server to communicate with said more than one gateway device, said Ethernet Local Management Interface server comprising:

an Ethernet Local Management Interface check function for gateway device discovery, and a Single Ethernet Virtual Connection Asynchronous Status procedure, where the Committed Information Rate is replaced by the maximum bandwidth a particular attached and active gateway device can use.

* * * * *